US007974234B2

(12) United States Patent
Gustave et al.

(10) Patent No.: US 7,974,234 B2
(45) Date of Patent: Jul. 5, 2011

(54) METHOD OF AUTHENTICATING A MOBILE NETWORK NODE IN ESTABLISHING A PEER-TO-PEER SECURE CONTEXT BETWEEN A PAIR OF COMMUNICATING MOBILE NETWORK NODES

(75) Inventors: Christophe Gustave, Aylmer (CA);
Vinod Kumar Choyi, Ottawa (CA);
Frederic Gariador, Ottawa (CA)

(73) Assignee: Alcatel Lucent, Paris (FR)

( * ) Notice: Subject to any disclaimer, the term of this patent is extended or adjusted under 35 U.S.C. 154(b) by 1934 days.

(21) Appl. No.: 10/970,137

(22) Filed: Oct. 22, 2004

(65) Prior Publication Data

US 2006/0087999 A1   Apr. 27, 2006

(51) Int. Cl.
*H04W 4/00* (2009.01)
*H04B 5/00* (2006.01)
*H04M 3/16* (2006.01)

(52) U.S. Cl. ........ 370/328; 455/41.1; 455/410; 455/411

(58) Field of Classification Search .................. 455/410; 370/328
See application file for complete search history.

(56) References Cited

U.S. PATENT DOCUMENTS

| 6,993,138 | B1* | 1/2006 | Hardjono | 380/281 |
| 2002/0141586 | A1 | 10/2002 | Margalit et al. | |
| 2003/0235175 | A1* | 12/2003 | Naghian et al. | 370/338 |
| 2004/0054885 | A1* | 3/2004 | Bartram et al. | 713/152 |
| 2004/0179502 | A1* | 9/2004 | Naghian et al. | 370/338 |
| 2005/0101293 | A1* | 5/2005 | Mentze et al. | 455/410 |
| 2005/0239438 | A1* | 10/2005 | Naghian | 455/410 |
| 2005/0266798 | A1* | 12/2005 | Moloney et al. | 455/41.2 |
| 2005/0266826 | A1* | 12/2005 | Vlad | 455/410 |

FOREIGN PATENT DOCUMENTS

| EP | 1146692 | 10/2002 |
| EP | 1458151 | 9/2004 |
| WO | WO 02/063847 | 8/2002 |
| WO | WO 02/073874 | 9/2002 |

(Continued)

OTHER PUBLICATIONS

3GPP TS 35.205 v5.0.0 (Apr. 2001), 3rd Generation Partnership Project, Specification of the MILENAGE Algorithm Set.

(Continued)

*Primary Examiner* — Patrick N Edouard
*Assistant Examiner* — Huy C Ho
(74) *Attorney, Agent, or Firm* — Kramer & Amado P.C.

(57) ABSTRACT

Methods for authenticating peer mobile network nodes for establishing a secure peer-to-peer communications context in an ad-hoc network are presented. The methods include accessing wireless infrastructure network entities at low bandwidth and for a short time duration to obtain cryptographic information regarding a peer mobile network node for the purpose of establishing secure peer-to-peer communications therewith ad-hoc network. Having received cryptographic information regarding a peer mobile network node, the method further includes challenging the peer network node with a challenge phrase derived from the cryptographic information received, receiving a response, and establishing a secure communications context to the peer mobile network node based on the validity of the received response. Advantages are derived from addressing security threats encountered in provisioning ad-hoc networking, by leveraging wireless infrastructure network security architecture, exemplary deployed in UMTS/GSM infrastructure networks, enabling seamless mobile network node authentication through the existing UMTS and/or GSM authentication infrastructure, while pervasively communicating with peer mobile network nodes in an ad-hoc network.

11 Claims, 6 Drawing Sheets

FOREIGN PATENT DOCUMENTS

WO    WO 2004002073    12/2003

OTHER PUBLICATIONS

3GPP TS 35.206 v4.0.0 (Apr. 2001), 3rd Generation Partnership Project, Specification of the MILENAGE Algorithm Set.

3GPP TS 33.102 v5.0.0 (Jun. 2002), 3rd Generation Partnership Project, Technical Specification Group Services and System Aspects.

GSM 03.20 v7.2.0 (Nov. 1999), Digital Cellular Telecommunications System (Phase 2+).

Arkko, J., et al., EAP AKA Authentication, Oct. 27, 2003.

Haverinen, H., et al., EAP SIM Authentication, Oct. 27, 2003.

Dhillon D. et al., "Implementing a fully distributed certificate authority in an OLSR Manet" IEEE Communications Society, 2004.

Ala-Laurila, J., Wireless LAN access Network Architecture for Mobile Operators, IEEE Communication Magazine, Nov. 2001.

* cited by examiner

METHOD OF AUTHENTICATING A MOBILE NETWORK NODE IN ESTABLISHING A PEER-TO-PEER SECURE CONTEXT BETWEEN A PAIR OF COMMUNICATING MOBILE NETWORK NODES

FIELD OF THE INVENTION

The invention relates to wireless communications provisioned via an ad-hoc communication network, and in particular to methods of authenticating mobile network nodes in establishing secure peer-to-peer contexts between mobile communications network nodes.

BACKGROUND OF THE INVENTION

Wireless communications are provisioned via infrastructure networks in which wireless devices connect to access points/base stations, and ad-hoc networks in which wireless devices connect to each other in peer-to-peer communications contexts.

In a wireless infrastructure network, each mobile network node is associated with a home environment. The association is performed at equipment registration and activation. The home environment encompasses service provider infrastructure tracking at least registered network node specific authentication information. While only of marginal importance to the invention, the home environment may also track statistics regarding registered network nodes and billing for pay-for-use services provisioned to registered nodes.

In use, a mobile network node is situated in a geographic area covered by at least one serving network. Each serving network includes wireless communications network infrastructure managed by a corresponding network provider entity. The network provider entity operating the serving network may be different from the service provider entity with which the mobile network node is registered.

A multitude of wireless mobile communications technologies exist which enable wireless mobile nodes to connect to access points/base stations of wireless infrastructure serving networks in order to establish communications contexts with other communications network nodes; establishing communications contexts with other wireless network nodes in close proximity being relevant to the present description. Wireless mobile nodes typically adhere to multiple wireless mobile communications technologies. Multiple serving networks, each adhering to a different group of wireless mobile communications technologies, coexist in serving overlapping coverage areas. Services are provided to mobile network nodes in an area either by a single local serving network or by a group of cooperating serving networks, including wired networks providing communications services; statistics and accounting being sent to respective home environments.

FIG. 1 provides a high level view of prior art authentication being performed in a wireless infrastructure network 100 adhering to Global System for Mobile Communications (GSM) or Universal Mobile Telecommunications System (UMTS) wireless communications protocols, the specifications of which are incorporated herein by reference.

Responsive to a wireless mobile node 102 attempting to connect 104 to the infrastructure exemplary shown as an access point/base station serving network proxy 106, the serving network proxy 106 retrieves 108 from a home environment 110 associated with the wireless mobile network node 102, sufficient information to authenticate the mobile node 102. The retrieved information is typically encapsulated and has a triplet, quintuplet, etc. authentication vector structure according to the technology employed. Herein after, information retrieved from the home environment 110 for the purposes of authenticating a mobile node 102 will be referred to generically as cryptographic information.

The serving network proxy 106 presents 112 the mobile node 102 with a challenge, based on the information obtained 108 from the home environment 110. A successful response 114 to the challenge 112 leads to a successful authentication of the mobile node 102. The serving wireless network 100 provides communications services to the mobile node 102, the provisioning of services may include services provided via the serving network proxy 106, and the home environment 110 may be informed 116 about services rendered to the mobile network node 102.

In the field of wireless mobile communications, convergence between different wireless communications technologies has recently been fueled by standardization bodies and by industry. The work in progress in the 3rd Generation Partnership Project (3GPP) in the area of 3GPP/WLAN interworking group, which serves to produce standards for the next generation of wireless devices, is exemplary of a current attempt towards convergence. Convergence, when achieved, will lead to an increasing availability of multi-standard wireless devices exemplary adhering to wireless communications standards such as, but not limited to: UMTS, Wireless Local Area Network (WLAN), GSM, Code-Division Multiple-Access (CDMA), Bluetooth, etc. the respective specifications of which are incorporated herein by reference.

To date, wireless technology convergence attempts include a 3GPP TS 23.234 specification for Wireless Local Area Network (WLAN) interworking, specification which is published on the Internet at http://www.3gpp.org/ftp/Specs/html-info/23234.htm, which is incorporated herein by reference, describing a system allowing access to 3G services and functionality from a WLAN access. Similar efforts include 3GPP2 for WLAN and WiMax interworking, and others.

Further attempts at wireless technology convergence are described in Internet publications: http://www.ietf.org/internet-drafts/draft-haverinen-pppext-eap-sim-12.txt, and http://www.ietf.org/internet-drafts/draft-arkko-pppext-eap-aka-11.txt, which are incorporated herein by reference, respectively relating to WLAN/GSM and WLAN/UMTS convergence and ways to connect to a WLAN using 3G or GSM authentication mechanisms such as, EAP SIM authentication and EAP AKA authentication.

Wireless ad-hoc communications networks are inherently susceptible to network-level security threats such as eavesdropping, mobile node impersonation, and/or unauthorized modifications of the underlying communication flows.

Despite the advantages provided by current prior art attempts, to date these attempts only provide solutions for convergence of wireless infrastructure networking technologies, there is a need to address the above mentioned security issues in support of ad-hoc communications networking.

SUMMARY OF THE INVENTION

In accordance with an aspect of the invention, a method of accessing cryptographic information regarding a peer mobile network node in support of establishing a secure peer-to-peer communications context via ad-hoc networking is provided. Method steps include: obtaining the mobile network node identification of the peer mobile network node; authenticating with a wireless infrastructure serving network; requesting cryptographic information regarding the peer mobile network node based on the peer mobile network node identification obtained; and receiving the cryptographic information.

In accordance with another aspect of the invention, a method of establishing a secure peer-to-peer communications context in an ad-hoc network between a pair of mobile network nodes is provided. In accordance with the method, each mobile network node retrieves information for authenticating peer mobile network node; the mobile network nodes challenge each other based on the authentication information; and responsive to a successful cross-authentication, the secure peer-to-peer context is established between the wireless network nodes employing ad-hoc networking techniques.

In accordance with a further aspect of the invention, a mobile network node adhering to a first wireless communications protocol for connection to a peer mobile network node in an ad-hoc network is provided. The mobile network node includes: peer mobile network node identifier retrieval means for obtaining the identification of a peer mobile network node for establishing a secure peer-to-peer communications session therewith; authentication information retrieval means for retrieving authentication information regarding the peer mobile network; authentication means for authenticating the peer mobile network node; and encryption means for encrypting content exchanged in an ad-hoc networking context with the peer mobile network node in provisioning the secure peer-to-peer communications context therebetween.

In accordance with yet another aspect of the invention, a mobile network node adhering to a wireless communications protocol for connection to a peer mobile network node in an ad-hoc network is provided. The mobile network node includes: an authentication information cache for caching authentication information regarding a plurality of mobile network nodes; and authentication information serving means for a serving a pair of mobile network nodes of the plurality of mobile network nodes with authentication information for establishing at least one cross-authenticated secure peer-to-peer communications context between the pair of mobile network nodes.

Advantages are derived from addressing security threats encountered in provisioning ad-hoc networking, by leveraging wireless infrastructure network security architecture, exemplary deployed in UMTS/GSM infrastructure networks, enabling seamless mobile network node authentication through the existing UMTS and/or GSM authentication infrastructure, while pervasively communicating with peer mobile network nodes in an ad-hoc network.

BRIEF DESCRIPTION OF THE DRAWINGS

The features and advantages of the invention will become more apparent from the following detailed description of the exemplary embodiments with reference to the attached diagrams wherein.

Figure 1:
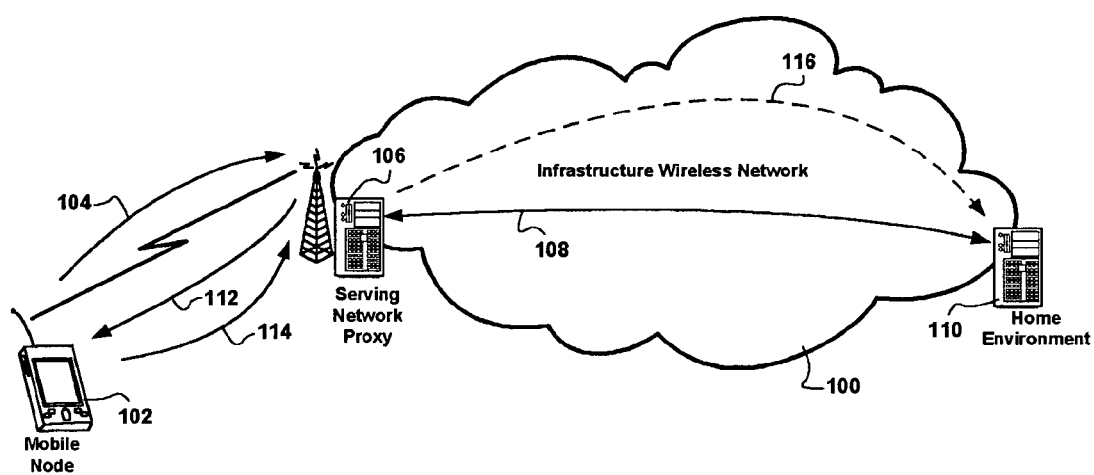
FIG. 1 is a schematic diagram showing interconnected wireless network elements and an authentication process enabling a wireless mobile network node to access communications services provided via a wireless infrastructure communications network.

It will be noted that in the attached diagrams like features bear similar labels.

DETAILED DESCRIPTION OF THE EMBODIMENTS

The coverage of infrastructure wireless communications networks is not ubiquitous, and a cost-benefit analysis shows that providing sustained stable coverage in hard-to-reach areas does not justify additional equipment deployment. However, use scenarios are prevalent, perhaps generated by an increasing number of features of mobile network nodes and services provisioned through the use of mobile network nodes, wherein secure wireless communication between a pair of, or a group of, mobile network nodes in close proximity, is needed. Ad-hoc networking would lend itself more to such use scenarios, and is also more desired. Such typical use scenarios include meetings in conference rooms where mobile network nodes are closer to each other than to wireless network infrastructure such as access points and/or base stations.

Due to an unstable nature of ad-hoc networks, it is difficult to establish a strong security context between the participating mobile network nodes. In view of the potential for eavesdropping, node impersonation, etc., authentication and message level protection would benefit from employing cryptographic techniques. The use of cryptographic techniques entails deploying and accessing cryptographic key infrastructure, distribution of cryptographic content such as cryptographic keys, and sharing of cryptographic information between heterogeneous network elements. Security features have been found difficult to deploy and manage in an ad-hoc network, due to the requirement of sharing cryptographic information.

In accordance with an exemplary embodiment of the invention, a degree of convergence between wireless infrastructure and ad-hoc communications technologies is proposed, namely to take advantage of authentication information retrieval techniques currently employed in existing wireless infrastructure networks (GSM, UMTS, etc.) to enable the establishment of secure wireless peer-to-peer contexts exemplary provisioned in WLAN ad-hoc networks, or Bluetooth ad-hoc networks. The invention is not intended to be limited to the use of the exemplary WLAN or Bluetooth technologies for ad-hoc networking, the invention applies equally to other ad-hoc networking technologies such as, but not limited to, IEEE 802.16, the specification of which is incorporated herein by reference.

In accordance with the exemplary embodiment of the invention, the use of existing exemplary wireless GSM or UMTS infrastructure, and of the respective authentication mechanisms, is leveraged to enable secure mobile peer-to-peer communications. In particular, methods are provided for using cryptographic information obtained by accessing a wireless infrastructure network to authenticate a peer mobile network node in establishing a. wireless peer-to-peer network therewith. Mobile network nodes are provided with means for requesting cryptographic information regarding peer mobile network nodes. Wireless infrastructure network entities are provided with means for receiving requests from mobile network nodes for cryptographic information regarding peer mobile network nodes, as well with means for providing the requested cryptographic information to requesting mobile network nodes.

Figure 2:
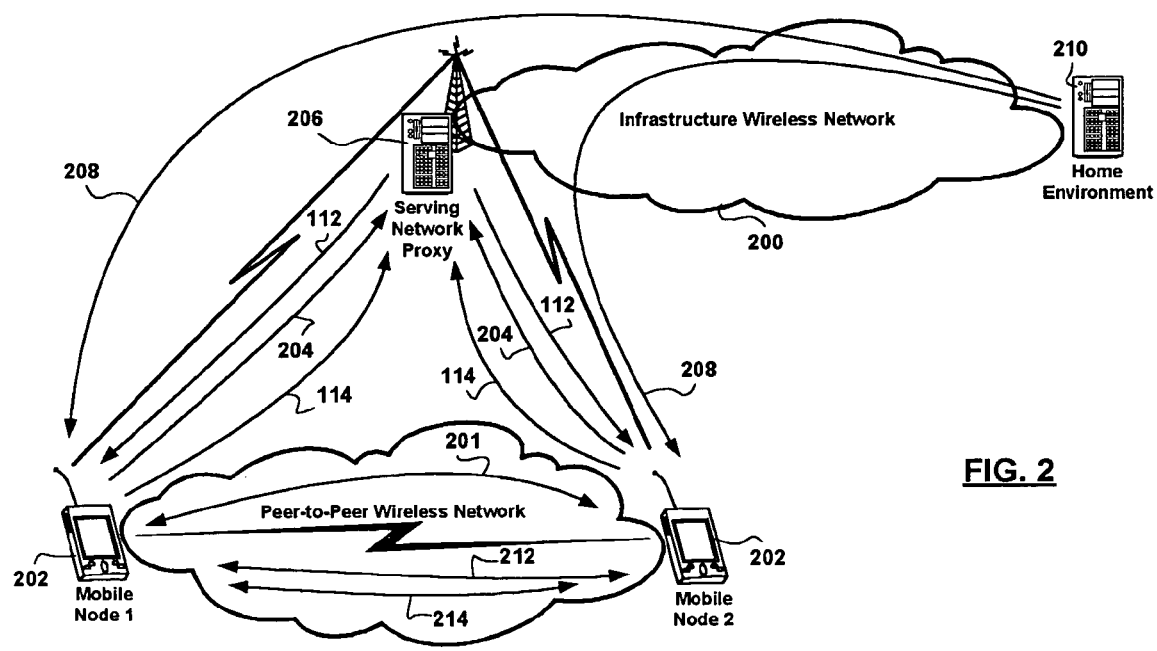
FIG. 2 is a high level schematic diagram showing, in accordance with an exemplary embodiment of the invention, interconnected wireless network elements cooperating to make cryptographic information available to wireless network nodes enabling the establishment of a secure peer-to-peer communications context.

FIG. 2 provides a high level view of exemplary interconnected communications network elements, and exemplary process steps followed in, provisioning cryptographic information to a pair of wireless mobile network nodes in support of the establishment of a direct secure peer-to-peer communication context between the pair of wireless communications nodes.

Following typical prior art authentication 112/114 with a serving network 200 assuming that both mobile network nodes 202-1 and 202-2 are registered with the same home environment 210, the establishment of a secure peer-to-peer communications context is initiated by the mobile network nodes 202-1 and 202-2 expressing the desire to communicate with each other, typically by an invitation 201 to establish, and participate in, a peer-to-peer wireless network—the mobile network nodes 202 may also advertise their availability for the establishment of a secure peer-to-peer communication context therewith. Without limiting the invention, the purpose of the invitation/advertisement 201 is to exchange mobile network node identifiers. For example, obtaining a mobile network node identifier of a peer mobile network node may also be achieved through a mobile network node identifier retrieval from a list.

The mobile node 202-1 and the mobile node 202-2, in order to authenticate one another in establishing a secure communications context, perform the following exemplary steps:

The mobile network node 202-1 requests 204, perhaps via a serving network proxy 206 (typically associated with an access point or base station), required cryptographic information to authenticate the mobile network node 202-2. Cryptographic information necessary to authenticate the mobile network node 202-2 is obtained 208 from home environment 210 of the mobile network node 202-2 and forwarded 208 to the mobile network node 202-1;

In parallel, the mobile network node 202-2 requests 204, perhaps via the serving network proxy 206, cryptographic information required to authenticate the mobile network node 202-1. Cryptographic information necessary to authenticate the mobile network node 202-1 is obtained 208 from home environment 210 of the mobile network node 202-1 and forwarded 208 to the mobile network node 202-2;

As each mobile network node 202-1 and 202-2 is in receipt of the necessary cryptographic information regarding the other respective mobile network node, each mobile network node 202-1 and 202-2 challenges 212 the respective other based on the cryptographic information provided; and Successfully responses 214 to the challenges 212 lead to a successful full-duplex cross-authentication and the establishment of a full-duplex secure context between the pair of mobile network nodes 202-1 and 202-2.

Persons of ordinary skill in the art would understand that each mobile network node 202 needs to authenticate 112/114 with the serving network 200 only once, which enables the authenticated mobile network node 202 to request 204 cryptographic information regarding multiple peer mobile network nodes 202. The common association of both mobile network node 202 with the home environment 210 assumes a degree of trust in provisioning cryptographic information to the mobile network nodes 202, at the same time the serving network proxy 206, see FIG. 2, vouches for the mobile network nodes 202 in forwarding requests 204 to the home environment 210. As will be shown herein below with reference to FIG. 5, the degree of trust may need to be managed in respect of a heterogeneous deployment.

In accordance with methods known in the art described in 3GPP TS 33.102 specification under "3G Security; Security Architecture" published on the internet at http://www.3gpp.org/ftp/Specs/html-info/33102.htm for UMTS wireless infrastructure networking, and in 3GPP TS 03.20 specification under "Security Related Network Functions" published on the internet at http://www.3gpp.org/ftp/Specs/html-info/0320.htm for GSM wireless infrastructure networking; cipher key, integrity keys, and other keys are derived by the respective mobile network nodes 202-1 and 202-2 from the cryptographic information received for use in securing the communication between the mobile network nodes 202-1 and 202-2.

Figure 3:
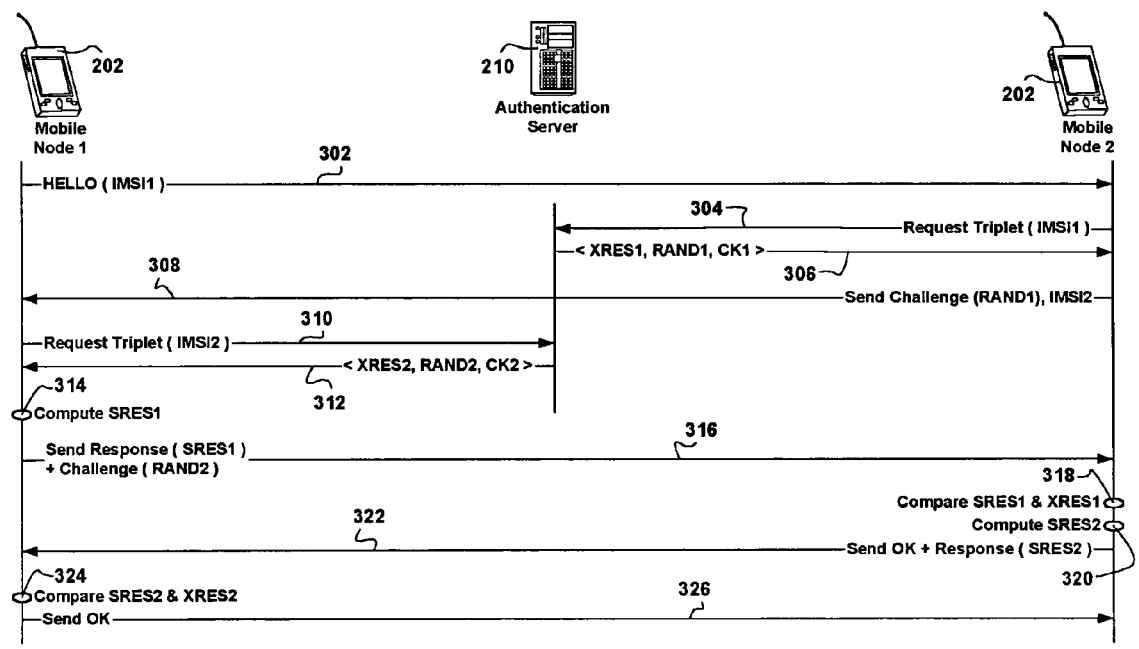
FIG. 3 is a message exchange diagram showing cross authentication steps performed in accordance with an exemplary GSM implementation of the exemplary embodiment of the invention.

FIG. 3 shows exemplary implementation details of the exemplary embodiment of the invention employing GSM security techniques. The message passing sequence establishes a secure peer-to-peer context:

The mobile network node 202-1 requires access to services provided via/from the mobile network node 202-2;

The mobile network node 202-1 sends 302 an initial hello message (201) conveying the identification IMSI1 of current user of the mobile network node 202-1 (in accordance with the GSM deployment paradigm handsets are defined by user specific smart cards which are connected to handsets to enable use thereof), the mobile network node 202-1 may optionally send the address or identity of the home authentication server (AuC/HLR) 210 that serves the mobile network node 202-1 (information about the home environment which may be specified on the smart card) or the address/identity of the AuC/HLR 210 may be derived by the mobile network node 202-2 or some other network element in the network in which the mobile network node 202-2 already participates in;

The mobile network node 202-2 requests 304 and retrieves 306 a credential triplet (cryptographic information) from the home authentication server 210;

The mobile network node 202-2 challenges 308 the mobile network node 202-1 using the retrieved random challenge phrase RAND1 (212), providing along therewith the user identity IMSI2 associated with the mobile network node 202-2;

The mobile network node 202-1 contacts home authentication server of mobile network node 202-2, which in accordance with the example is the same home authentication server 210, in order to request 310 and retrieve 312 the associated triplet credentials (cryptographic information) of mobile network node 202-2;

The mobile network node 202-1 uses both RAND1 and the secret key k1 securely stored on the smart card of the GSM mobile network node 202-1 to compute 314 an SRES1 response (214);

The mobile network node 202-1 sends 316 the computed 314 result SRES1 (214) along with the previously retrieved 312 random challenge phrase RAND2 (212) to the mobile network node 202-2;

The mobile network node 202-2 compares 318 SRES1 and the expected result XRES1 obtained in step 306 which must be equal. If not, the authentication process fails;

The mobile network node 202-2 uses both RAND2 and the secret key k2 securely stored on the smart card of the GSM mobile network node 202-2 to compute 320 an SRES2 response (214);

The mobile network node 202-2 sends 322 the computed 320 response SRES2 (214) along with an acknowledgement that the mobile network node 202-1 was successfully authenticated to the mobile network node 202-1;

The mobile network node 202-1 compares 324 SRES2 and the expected result XRES2 obtained in step 312 which must be equal. If not, the authentication process fails; and The mobile network node 202-1 sends 326 an acknowledgement that the mobile network node 202-2 was successfully authenticated to the mobile network node 202-2.

Upon successful mutual authentication, full-duplex secure channel creation ensues. Cipher keys CK1 and CK2 may be used for bi-directional links or CK1 for one direction and CK2 for the opposite direction, without limiting the invention. It is envisioned that the cipher key CK1 may be XOR'ed with the cipher key CK2 and the result can be used as a new cipher key, alternatively any other combination of cipher keys CK1 and CK2 may be used to derive a new cipher key.

Method steps 112/114 authenticating mobile network nodes 202-1 and 202-2 with the serving network proxy 206 (access point/base station) are not shown in FIG. 3 for brevity. The authentication sequence may be triggered in respect of each mobile network node 202 by cryptographic information requests 304 and 310, the authentication with the serving network proxy 206 remaining valid for multiple subsequent cryptographic information requests 304/310.

Figure 4:
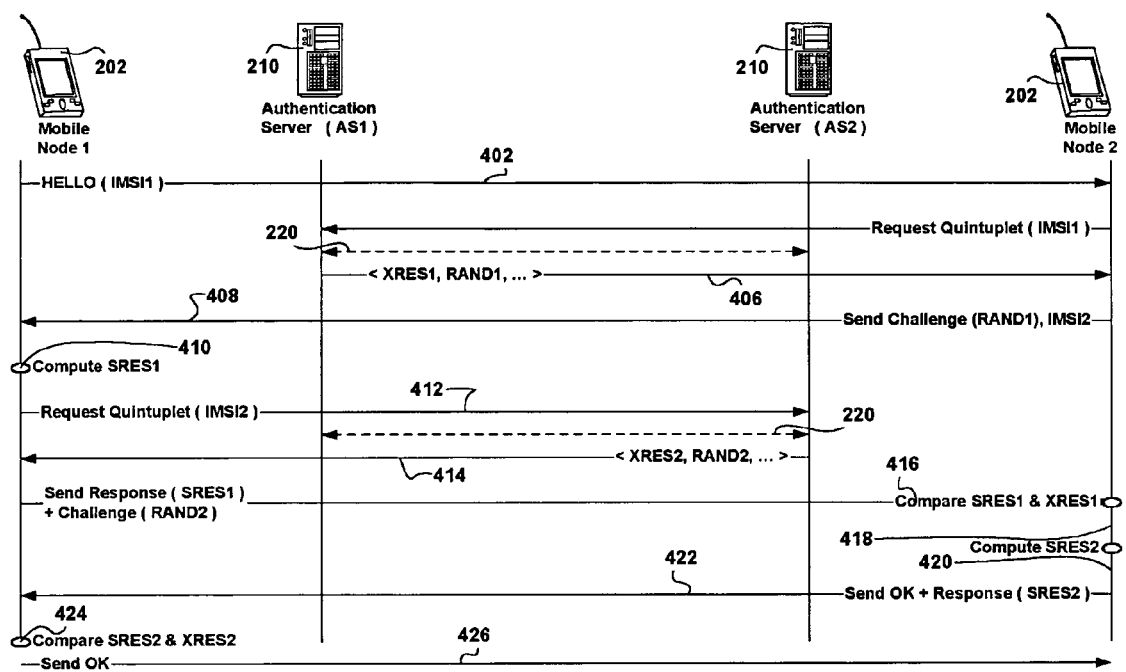
FIG. 4 is a message exchange diagram showing cross authentication steps performed in accordance with an exemplary UMTS implementation of the exemplary embodiment of the invention.

FIG. 4 shows exemplary steps performed in setting up a secure communication context between two UMTS mobile network nodes 202-1 and 202-2 using the UMTS Authentication and Key Agreement (AKA) security mechanism:

The mobile network node 202-1 requires access to services provided via/from mobile network node 202-2;

The mobile network node 202-1 sends 402, along with an initial hello message (201), the user identity IMSI1 associated therewith. The mobile network node 202-1 may optionally send (402) the address or identity of the HSS (HE/Radius/Diameter) 210-1 with which the mobile network node 202-1 is registered (home environment), or the address/identity of the HSS/AS/HE 210-1 may be derived by the mobile network node 202-2 using the IMSI1 identity. Alternatively, another network element associated with The mobile network node 202-2 may be employed derive authentication server AS1 (home environment equipment) with which the mobile network node 202-1 is registered;

The mobile network node 202-2 requests 404 from the HSS/Diameter/Authentication server 210, and retrieves 406, cryptographic information in the form of an authentication quintuplet (RAND1, XRES1 . . . ) corresponding to the mobile network node 202-1;

The mobile network node 202-2 challenges 408 the mobile network node 202-1 with the retrieved 406 random phrase RAND1 (212) provided in the quintuplet, and also sends the subscriber identity IMSI2 associated with the mobile network node 202-2;

The mobile network node 202-1, upon receiving 408 the challenge phrase RAND1 computes 410 a response SRES1 (214) to the challenge using a shared secret k1 (stored in the SIM) and the RAND1 as inputs to the UMTS-AKA f2 algorithm. The mobile network node 202-1 may also derive a cipher key and an integrity key using RAND1 and k1 as inputs to UMTS-AKA algorithms f3 and f4. The algorithms f2, f3, and f4 are described in the 3GPP TS 35.205 and 3GPP TS 35.206 published on the internet at http://www.3gpp.org/ftp/Specs/html-info/35-series.htm, specifications which are incorporated herein by reference;

The mobile network node 202-1, having received 408 the IMSI2 identifier of the mobile network node 202-2, requests 412 from the mobile subscriber authentication server (HSS/Diameter) 210-2 with which the mobile network node 202-2 is registered with cryptographic information regarding the mobile network node 202-2;

The authentication server 210-2 provides 414 the mobile network node 202-1 with the cryptographic information in the form of an authentication quintuplet (RAND2, XRES2 . . . );

The mobile network node 202-1 sends 416 the computed 410 response SRES1 (214) to the mobile network node 202-2 and also challenges (214) the mobile network node 202-2 using the RAND2 retrieved 414 from the authentication server 210-2;

The mobile network node 202-2 compares 418 the received (416) response SRES1 (214) with the expected result XRES1 previously obtained 406 from the authentication server 210-1 which must be equal. If not, the authentication process fails.

If mobile network node 202-1 is successfully authenticated, the mobile network node 202-2 computes 420 the response SRES2 (214) using RAND2 and secret k2;

The mobile network node 202-2 sends 422 the SRES2 to MN1 along with an indication that the mobile network node 202-1 was successfully authenticated;

The mobile network node 202-1 compares 424 the retrieved 414 XRES2 with the received 422 SRES2 to authenticate mobile network node 202-2; and The mobile network node 202-1 sends 426 an indication that the mobile network node 202-2 was successfully authenticated, and a full-duplex secure communications context establishment ensues.

Same cipher keys may be used for bi-directional links or CK1 may be used for one direction and CK2 may be used for the opposite direction. The integrity keys may be used in a similar way.

As each mobile network node 202-1 and 202-2 requests 404/412 cryptographic information from a home environment 210 with which the peer mobile network node is associated with, and as shown in FIG. 4, the home environment 210 being one with which the requesting mobile network node 202 is not registered, may validate 220 the request 404/412 by contacting the home environment 210 of the requesting mobile network node.

Method steps 112/114 authenticating mobile network nodes 202-1 and 202-2 with the serving network proxy 206 (access point/base station) are not shown in FIG. 4 for brevity. The authentication sequence may be triggered in respect of each mobile network node 202 by cryptographic information requests 404 and 412, the authentication with the serving network proxy 206 remaining valid for multiple subsequent cryptographic information requests 404/412.

Figure 5:
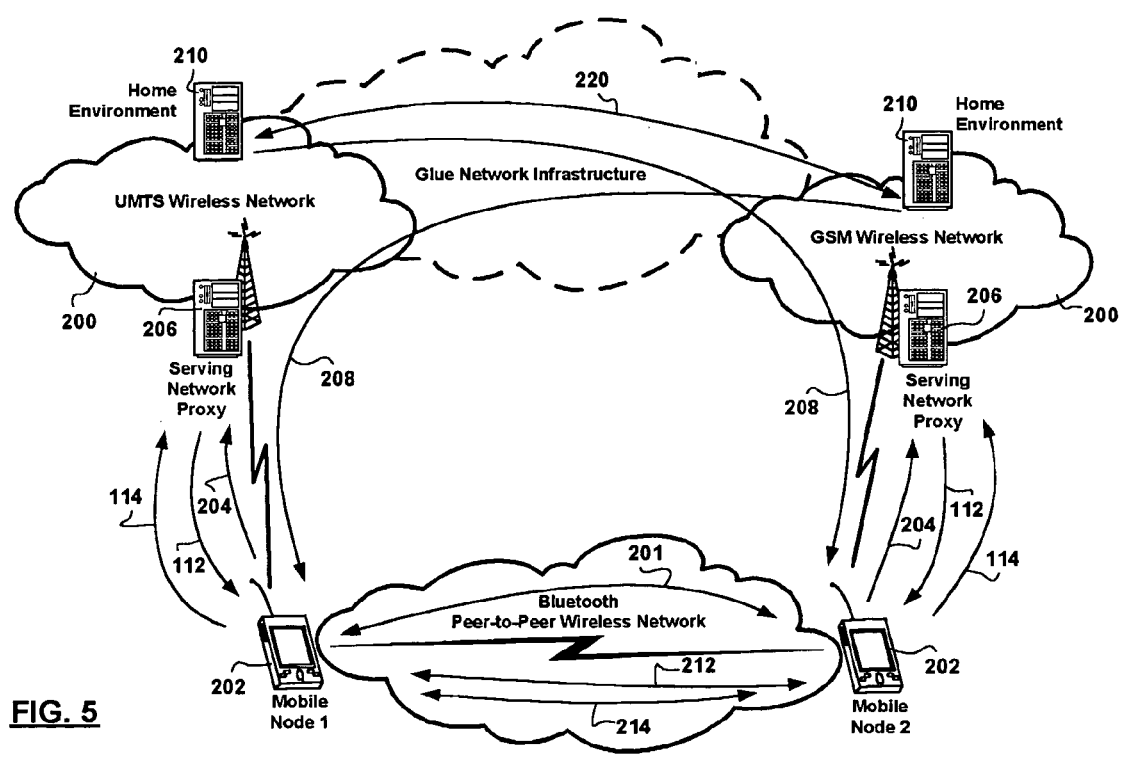
FIG. 5 is a high level schematic diagram showing, in accordance with the exemplary embodiment of the invention, an exemplary hybrid deployment of equipment enabling the establishment of a secure peer-to-peer communications context.

In accordance with another implementation of the invention shown in FIG. 5, a hybrid authentication technique would be employed in respect of a heterogeneous group of mobile network nodes 202. For example, mobile network node 202-1 supports UMTS and Bluetooth, whereas mobile network node 202-2 supports GSM and Bluetooth. Each mobile network node 202 accesses a corresponding serving network proxy 206 (associated with access points/base stations of the serving networks 200), the GSM and UMTS networks 200 providing the infrastructure for provisioning the necessary cryptographic information. Having received the cryptographic information, the mobile network nodes 202 challenge 212 each other while communicating between each other using Bluetooth.

For greater certainty, in respect of the use scenario depicted in FIG. 5 it is assumed that once a mobile network node 202 authenticates 112/114 with the corresponding serving network 200, that authentication provides "unlimited access" to cryptographic information available from peer HE's 210. In practice, cross domain access to cryptographic information needs to be controlled. In accordance with an exemplary implementation, the home environment 210 of the mobile network node 202 requesting (204) cryptographic information from a different home environment 210, is requested to vouch for the authenticity of the requesting mobile network node 210. Without limiting the invention, such vouchers are typically obtained via a query/response exchange 220 between the two home environments 210.

In accordance with the exemplary embodiment of the invention, a secure context is provided for at least a pair of mobile network nodes 202 to establish peer-to-peer connectivity between the pair of mobile network nodes 202 in an ad-hoc network while necessitating only a limited time duration access to a wireless network infrastructure to obtain cryptographic information without compromising security; the limited time duration access to the wireless network infrastructure being secured by existing methods.

It is understood that the cryptographic information request 204 and the cryptographic information provisioning 208 steps, need not be immediately followed by the challenge 212/response 214 exchange. For example, each mobile network node 202-1 and 202-2 may request 204 and receive 208 the cryptographic information regarding the respective other mobile network node while in the coverage area of the infrastructure network 200, and selectively perform the challenge 212/response 214 exchange at a later time while outside the coverage area of the infrastructure network 200. Implementations are envisioned in which mobile network nodes 202 request cryptographic information directly from the home environment 210, as well implementations are envisioned wherein mobile network nodes 202 cache cryptographic information for later use as needed whether in the coverage area of a serving network or not.

Figure 6:
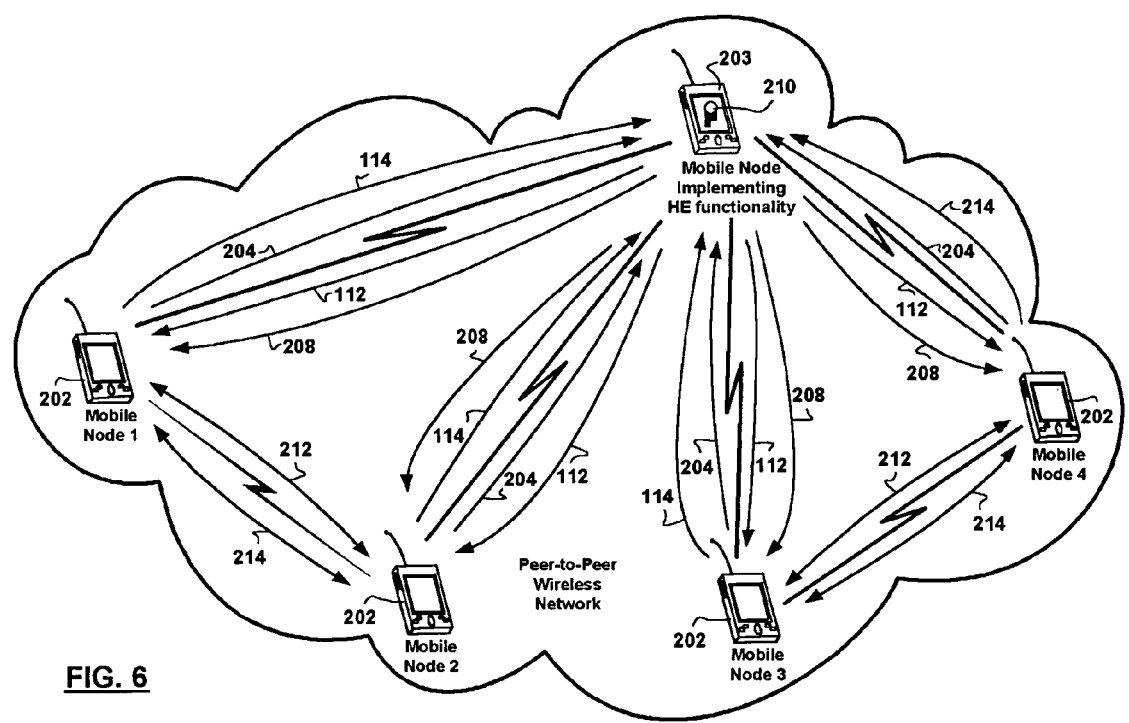
FIG. 6 is a schematic diagram showing, in accordance with the exemplary embodiment of the invention, mobile network nodes establishing secure communications contexts therebetween based on cached cryptographic information.

Another exemplary implementation of the exemplary embodiment of the invention shown in FIG. 6 includes a mobile network node 203 caching cryptographic information for the purposes of providing home environment 210 functionality. An exemplary use scenario includes a meeting at a weekend retreat outside the coverage area of any wireless infrastructure network and assumes that the retreat is shorter than the life span of the cryptographic information. The mobile network node 203 retrieves 208 cryptographic information regarding mobile network nodes 202 expected to be present at the retreat; and the mobile network node 203, operating as a floating AuC/HSS 210, provides access to the cached cryptographic information for mobile network nodes 202 within reach. In accordance with this use scenario, the AuC 210 is not a physical entity part of an infrastructure-based network, but a service. Each mobile network node 202 retrieves 208 cryptographic information from the mobile network node 203 operating as a floating AuC 210 on a need to use basis.

In order to access the floating AuC 210, a cross-authentication with the mobile network node 203 is necessary. In accordance with the exemplary embodiment of the invention, the floating AuC 210 has sufficient cryptographic information regarding each mobile network node 202 expected to participate in the ad-hoc network, cryptographic information which is valid for a long enough period of time, to authenticate 112/114 each mobile network node 202 in providing access to cryptographic information regarding peer mobile network nodes 202. Accordingly, the mobile network node 203/floating AuC 210, upon receiving a request 204 for cryptographic information from mobile network node 202-1 regarding mobile network node 202-2, provisioning the cryptographic information 208 is paused pending authentication 112/114 of the mobile network node 202-1. The authentication of each mobile network node 202 for access to cryptographic information, includes sending a challenge 112 to the mobile network node 202 requesting access to cryptographic information, and receiving a response 114 therefrom. The authentication 112/114 needs to be performed only once and would remain valid for multiple cryptographic information requests 204.

Using the robust encryption mechanisms of wireless infrastructure networks such as, but not limited to, GSM and UMTS wireless infrastructure network, and integrity protection exemplary of UMTS wireless infrastructure networks, the protection of the wireless peer-to-peer content exchange between pairs of colleagues (groups) is greatly increased preventing snooping by unwelcome third parties. Using the proposed approach, users belonging to a group or an organization attending a conference or meeting can communicate securely and privately in a peer-to-peer manner without the need for the traffic to be bounced off access points/base stations. Noting that the request 204 for, and the provisioning 208 of, cryptographic information requires very little bandwidth, the peer-to-peer connectivity as opposed to connectivity via a wireless infrastructure enables content exchange at potentially higher bandwidth than would be available via a wireless infrastructure.

The embodiments presented are exemplary only and persons skilled in the art would appreciate that variations to the above described embodiments may be made without departing from the spirit of the invention. The scope of the invention is solely defined by the appended claims.

We claim:

1. A method of accessing authentication information regarding a peer mobile network node in support of establishing a secure peer-to-peer communications context via ad-hoc networking, the method comprising:
   a. obtaining the mobile network node identification of the peer mobile network node;
   b. authenticating with a wireless infrastructure serving network;
   c. requesting information for authenticating the peer mobile network node based on the peer mobile network node identification obtained; and
   d. receiving the authentication information at a mobile network node with which the peer mobile network node is to establish the secure peer-to-peer communications context, the authentication information received directly from a home environment associated with the peer mobile network node.

2. The method claimed in claim 1, wherein obtaining the mobile network node identification of the peer mobile network node, the method comprises one of receiving an invitation form the peer mobile network node to establish the secure peer-to-peer communications context therewith, receiving an advertisement of availability for the establishment of the secure peer-to-peer communications context therewith, and retrieving the mobile network node identification form a list of mobile network node identifiers.

3. The method claimed in claim 1, wherein authenticating with a wireless infrastructure serving network, the method comprises authenticating with a serving network proxy.

4. The method claimed in claim 1, wherein the serving network proxy comprises one of a wireless communications network infrastructure element and a mobile network node caching authentication information for authenticating the peer mobile network node.

5. The method claimed in claim 1, further comprising validating the request for cryptographic information.

6. The method claimed in claim 1, wherein the authentication information comprises cryptographic information.

7. A method of establishing a secure peer-to-peer communications context in an ad-hoc network between a pair of mobile network nodes comprising:
   a. each mobile network node retrieving information for authenticating a peer mobile network node directly from a home environment associated with the peer mobile network node;
   b. the pair of mobile network nodes challenging each other based on the authentication information; and
   c. responsive to a successful cross-authentication, establishing the secure peer-to-peer context between the wireless network nodes employing ad-hoc networking techniques.

8. The method claimed in claim 7, further comprising a prior step of authenticating with a wireless infrastructure service network for retrieval of authentication information regarding the peer mobile network node.

9. The method claimed in claim 7, wherein retrieving information for authenticating peer mobile network node, the method further comprises retrieving information for authenticating a plurality of peer mobile network nodes for establishing a corresponding plurality of secure peer-to-peer communication contexts with a plurality of peer mobile network nodes.

10. The method claimed in claim 7, wherein retrieving information for authenticating peer mobile network node, the method comprises retrieving one of an authentication triplet for a peer mobile network node adhering to the Global System for Mobile Communications (GSM) wireless communications protocol, and an authentication quintuplet for a peer mobile network node adhering to the Universal Mobile Telecommunications System (UMTS) wireless communications protocol.

11. The method claimed in claim 7, wherein the authentication information includes cryptographic information, the method further comprising:
   a. deriving at least one cipher key form authentication information regarding at least one of the mobile network nodes of the pair of mobile network nodes; and
   b. encrypting content exchanged in respect of the secure peer-to-peer communications context using the at least one cipher key.

* * * * *